Jan. 20, 1953 G. AGINS 2,625,825
ERECTING DEVICE FOR GYROSCOPES
Filed March 8, 1951

INVENTOR.
GEORGE AGINS

BY *Raymond A. Paquin*
ATTORNEY.

Patented Jan. 20, 1953

2,625,825

UNITED STATES PATENT OFFICE 2,625,825

ERECTING DEVICE FOR GYROSCOPES

George Agins, Santa Monica, Calif., assignor to Arma Corporation, Brooklyn, N. Y., a corporation of New York Application March 8, 1951, Serial No. 214,614

11 Claims. (Cl. 74—5.44)

The present invention relates to gyroscopes and more particularly to vertical spin axis gyroscopes and has special reference to erecting means therefor.

Various types of gravity erection means are familiar to those in the art including rolling ball type and the like. All of these prior methods are designed to produce a phase difference between the plane of tilt of the gyro spin axis and the plane in which the erecting force is applied, whence the gyro spin axis erects into the true vertical. The optimum phase difference which all these methods seek to provide is 90° so that the erection of the spin axis is accomplished in the shortest time, directly into the vertical. Phase differences other than 90° also effect erection into the vertical, but along the familiar spiral course.

In the present invention a mechanical system, which is tuned to a natural frequency proportional to the nominal rotational velocity of the gyroscope rotor, is driven by one of the rotor shafts. The mechanical system consists essentially of a vertically disposed mechanical reed which carries a weight on its free end and is secured to a rotating shaft at its fixed end.

When the spin axis of the gyro is tilted out of the true vertical, the weight on the reed causes a varying disturbing force to be applied to the reed in its plane of vibration to thereby force the reed to vibrate at a frequency at or near its natural frequency. The reed therefore experiences a maximum deflection out of phase with the plane of tilt and has a mean effective position approximately half-way between the spin axis and the maximum deflection. Thus, the reed weight is displaced from the gyro spin axis and tends to pull the gyro spin axis out of the plane of tilt in a direction such that the resulting precession of the gyroscope erects the spin axis into the true vertical.

Figure 1:
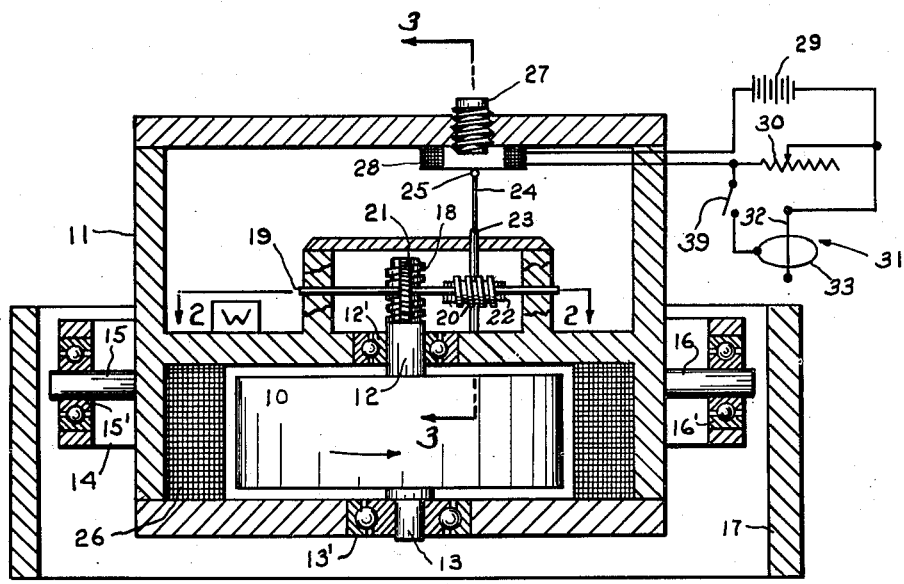
Figure 2:
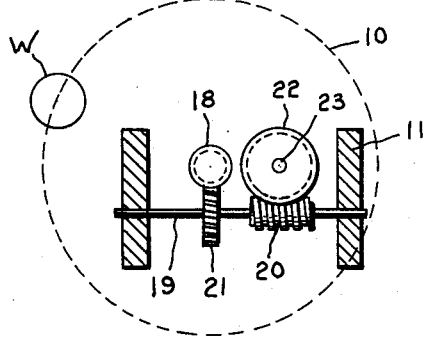
Figure 3:
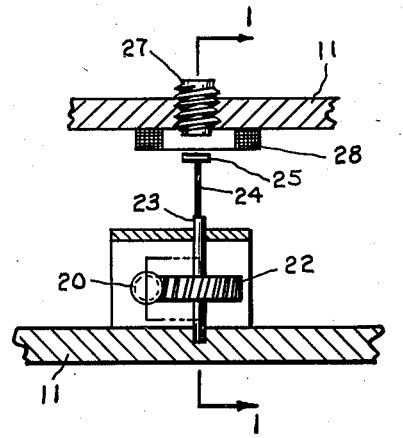

For a more complete understanding of this invention reference may be had to the accompanying diagrams, in which, Fig. 1 is a cross sectional view taken on line 1—1 of Fig. 3, looking in the direction of the arrows, of a gyroscope embodying the present invention, Fig. 2 is a section through line 2—2 of Fig. 1, looking in the direction of the arrows, and Fig. 3 is a section through line 3—3 of Fig. 1, looking in the direction of the arrows.

Figure 1 is a schematic representation of a vertical section through a three axis of freedom vertical spin axis gyroscope embodying the present invention. The gyro rotor 10 is supported within casing 11 by the upper and lower shafts 12 and 13 respectively journalled in their respective bearings 12' and 13', and is preferably driven by electrical inductive reaction with the energized winding 26. Casing 11 is supported by horizontal shafts 15 and 16 journalled within bearings 15' and 16' held within the gimbal ring 14, which is in turn supported by horizontal shafts (not shown) perpendicular to shafts 15 and 16 journalled within the supporting frame 17.

The upper shaft 12 of the rotor 10 is terminated in a worm gear 18 which drives the shaft 19 and worm gear 20 by means of the meshing gear 21. Worm gear 20 drives gear 22 and thereby drives shaft 23. Extending vertically upward from shaft 23 is the mechanical reed 24 which carries the weight 25 on its free end. Although the reed is shown as extending upward, the gears 18, 20, 21 and 22 may alternatively be driven by shaft 13, with reed 24 hanging downward, if desired, without affecting the operation of the invention. The weight 25 is preferably of magnetic and electrically conducting material for damping purposes as will be explained later. The weight W is provided in order to compensate for the static unbalance produced by the weight of gears 20, 21, 22, shafts 19 and 23 and of reed 24 and its weight 25 as a result of their displacement from the suspension axes of case 11.

In operation, rotation of the gyro wheel 10 causes rotation of shaft 23 and reed 24. When the gyro spin axis is tilted out of the vertical, the axis of rotation of reed 24 is similarly displaced from the vertical and the weight 25 applies a bending force to the reed 24. Rotation of reed 24 causes the resistance to bending to vary periodically as the plane of the reed rotates so that a periodic force is applied to the reed 24 which forces the reed 24 into vibration.

If the reed 24 is proportioned so that its dynamic natural frequency, that is, its natural frequency while rotating, corresponds to the nominal rotational speed of the shaft 23 (proportional to the speed of wheel 10) then the condition of resonance is achieved and the maximum deflection of reed 24 occurs out of phase with the application of the maximum bending force, with the deflection lagging the force. The static natural frequency of reed 24 must be $\sqrt{2}w$ in order that the dynamic natural frequency of reed 24 will be $w$ when rotating at a speed $w$.

Assume for example that in Fig. 1 the top of the gyro spin axis is tilted out of the plane of the drawing, i. e. toward the observer, and that the gyro wheel 10 is rotating in the direction of the arrow. The gearing between rotor 10 and shaft 23 is such that shaft 23 rotates in the same direction as the rotor 10. Thus, as shaft 23 rotates and the top of the gyro is tilted toward the observer, the reed 24 experiences a maximum deflection to the right in Fig. 1, assuming the condition of resonance to apply. It will be seen that during each revolution of shaft 23 the weight 25 undergoes two cycles of displacement to the right, and has an average or effective position halfway between the maximum displacement and the gyro spin axis.

Thus, the position of weight 25 produces a weight unbalance and causes a torque to be applied to the gyro such that the top of the spin axis is urged to the right thereby causing precession of the top of the gyro spin axis into the plane of the drawing Fig. 1 and therefore causing erection of the spin axis into the true vertical. The magnitude of the vibration of reed 24 is proportional to the tilt of the axis of rotation from the vertical, whence the erection rate of the spin axis is proportional to the deviation of the spin axis from the true vertical.

For ease of description it has been assumed that the ideal condition of resonance of reed 24 is attained during the operation of this invention. In the usual case, however, the speed of wheel 10 cannot be maintained at the exact speed required to turn shaft 23 at the speed for which reed 24 is resonant. Then, instead of the ninety degree phase lag between the bending force and deflection of reed 24, the phase angle is less than 90° for slower speeds and more than 90° for higher speeds. Nevertheless, it will be seen that the gyro spin axis follows the familiar spiral route, as erection into the true vertical is accomplished.

Variable viscous damping of the vibration of reed 24 is provided by the magnetized slug 27 which is threaded in casing 11 directly over the shaft 23 and weight 25. The distance of the lower face of slug 27 from the top of reed 24 may be varied by rotating the slug 27, thus varying the strength of the magnetic field in which the reed 24 vibrates. Alternatively, a variable magnetic field may be provided by the winding 28 energized by power supply 29 through variable resistor 30.

As the weight 25 moves across the vertical magnetic field electrical current is induced in the weight 25 thereby producing a magnetic field which opposes the motion of the weight thereby effecting the viscous damping of the reed 24.

Provision is made for reducing the effects of acceleration forces on weight 25 during changes of speed or course of the vehicle carrying the compass by energizing the coil 28 by the full voltage of power supply 29 which effectively stiffens reed 24 during such changes. Switch 31, connected across resistor 30, is essentially composed of a stationary contact 32 in the form of a ring which surrounds a pendulous movable contact 33. When the rate of change in speed or course is sufficient to cause the pendulous contact 33 to swing into cooperation with ring 32, switch 31 short circuits resistor 30 so that coil 28 is energized directly by power supply 29. The magnetic field thus produced attracts the weight 25 and thus stiffens the reed 24 to minimize the displacement of weight 25 by the acceleration force. It should be realized that for proper operation switch 31 must be mounted in a stabilized position which may be on case 11 of the gyroscope for example, or on a platform stabilized by the gyroscope in the usual manner which will not be described here. Also, to prevent "locking" of the system when attempting to put the gyro into operation from a tilted position switch 31 must be disconnected from the circuit during starting periods. To this end switch 34 is provided and is left open until the gyroscope is in the normal operating position when the spin axis is vertical.

Although a preferred embodiment of the invention has been illustrated and described herein, it is to be understood that it is by way of illustration only and that the invention is not limited thereby, but is susceptible of changes in form and detail within the scope of the appended claims.

I claim:

1. In an erection system for gyroscopes, a vertical disposed reed, said reed being secured adjacent one end to a rotating shaft and carrying a weight adjacent its free end.

2. In an erection system for gyroscopes, a vertically disposed reed, said reed being secured adjacent one end to a rotating shaft and carrying a weight adjacent its opposite end and means cooperating with said weight for variable damping of the vibration of said reed.

3. In an erection system for gyroscopes, a vertically disposed reed, said reed being secured to a rotating shaft and carrying a weight adjacent its free end, said weight being of electrically conducting material and electrical means cooperating with said weight for variable damping of the vibration of said reed.

4. In an erection system for gyroscopes, a vertically disposed reed, said reed being secured adjacent one end to a rotating shaft and carrying a weight member adjacent its free end, means for effecting variable damping of the vibration of said reed, said means comprising a member adapted to cooperatively function with said weight, one of said members having magnetic means adapted to effect damping of the vibration of said reed.

5. In an erecting system for gyroscopes, a vertically disposed reed, said reed being secured adjacent one end to a rotating shaft and carrying a weight member adjacent its free end, means for effecting variable damping of the vibration of said reed, said means comprising a member adapted to cooperatively function with said weight, one of said members having magnetic means to effect damping of the vibration of said reed and means for varying the strength of said magnetic means.

6. In an erection system for gyroscopes, a vertically disposed reed, said reed being secured adjacent one end to a rotating shaft and carrying a weight member adjacent its free end, means for effecting variable damping of the vibration of said reed, said means comprising a member adapted to cooperatively function with said weight member, one of said members having magnetic means adapted to effect damping of the vibration of said reed and a variable resistor for varying the strength of said magnetic means.

7. In an erection system for gyroscopes, a vertically disposed reed, said reed being secured to a rotating shaft and carrying a weight adjacent its free end, said weight being of electrically conducting material and electrical means for creating a magnetic field adjacent said weight and adapted to cooperatively function with said weight to effect viscous damping of the vibration of said reed.

8. In an erection system for gyroscopes, a vertically disposed reed, said reed being secured to a rotating shaft and carrying a weight adjacent its free end, said weight being of electrically conducting material and electrical means for creating a magnetic field adjacent said weight and adapted to cooperatively function with said weight to effect viscous damping of the vibration of said reed and means whereby the strength of said magnetic field may be varied.

9. In an erection system for gyroscopes, a vertically disposed reed, said reed being secured to a rotating shaft and carrying a weight adjacent its free end, said weight being of electrically conducting material and electrical means for creating a magnetic field adjacent said weight and adapted to cooperatively function with said weight to effect viscous damping of the vibration of said reed and a variable resistor for varying the strength of said magnetic field.

10. In an erection system for gyroscopes, a vertically disposed reed, said reed being secured to a rotating shaft and carrying a weight adjacent its free end, said weight being of electrically conducting material and electrical means for creating a magnetic field adjacent said weight and adapted to cooperatively function with said weight to effect viscous damping of the vibration of said reed, said electrical means being adjustable relative to said weight.

11. In an erection system for gyroscopes, a vertically disposed reed, said reed being secured to a rotating shaft and carrying a weight adjacent its free end, said weight being of electrically conducting material and electrical means for creating a magnetic field adjacent said weight and adapted to cooperatively function with said weight to effect viscous damping of the vibration of said reed, said electrical means comprising a magnetized member which is adjustable relative to said weight.

GEORGE AGINS.

REFERENCES CITED

The following references are of record in the file of this patent:

UNITED STATES PATENTS

| Number | Name | Date |
|---|---|---|
| 1,984,859 | Bates | Dec. 18, 1934 |
| 2,274,443 | Fischer | Feb. 24, 1942 |
| 2,480,263 | Raspet | Aug. 30, 1949 |
| 2,510,068 | Carter | June 6, 1950 |
| 2,511,178 | Roters | June 13, 1950 |